R. W. ASHLEY.
VEHICLE WHEEL RIM.
APPLICATION FILED MAR. 14, 1916.

1,219,064.

Patented Mar. 13, 1917.
2 SHEETS—SHEET 1.

Inventor
Robert W. Ashley

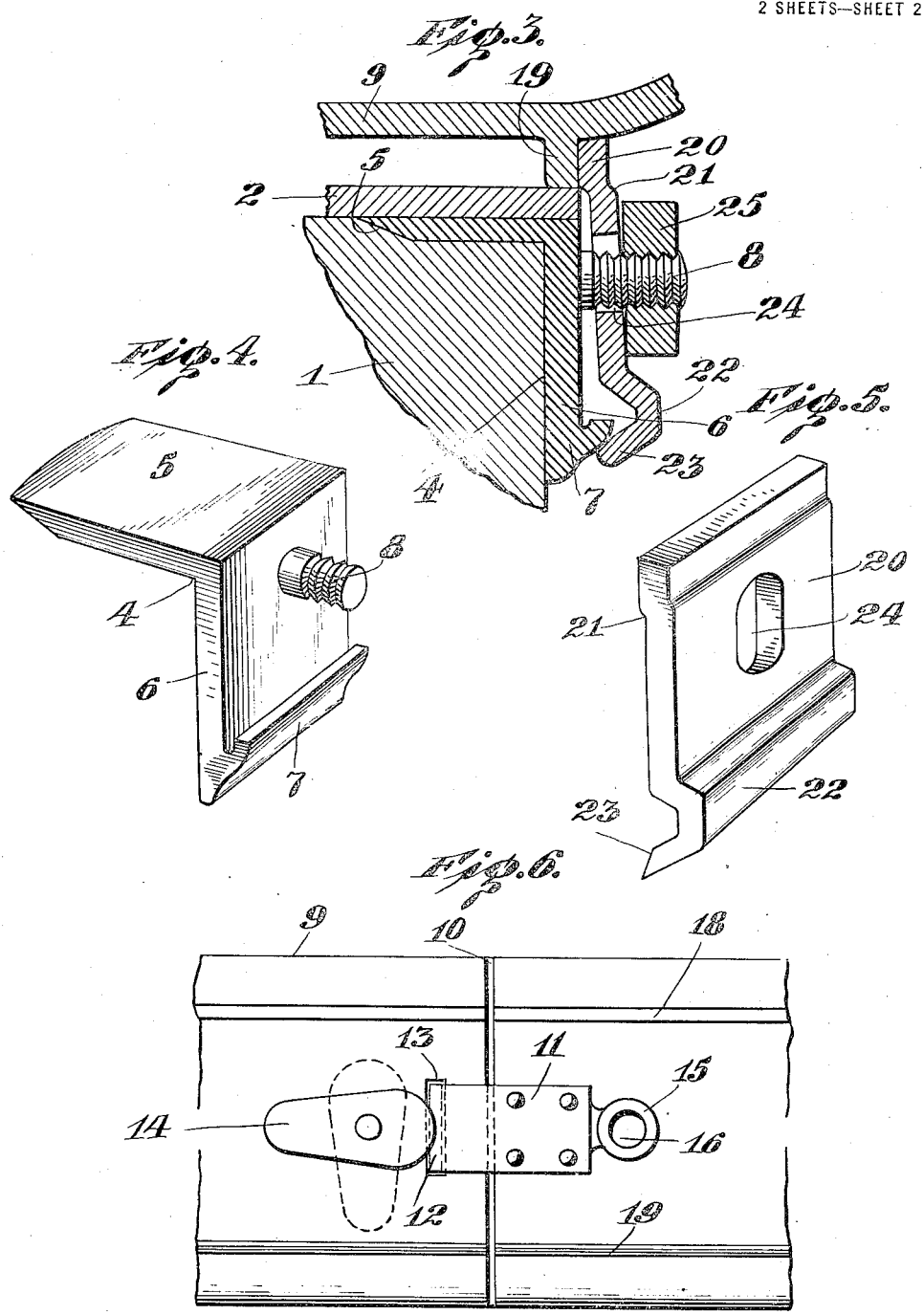

UNITED STATES PATENT OFFICE.

ROBERT W. ASHLEY, OF NEW YORK, N. Y., ASSIGNOR OF ONE-HALF TO FRANK OBERKIRCH, OF ST. MARYS, PENNSYLVANIA.

VEHICLE-WHEEL RIM.

1,219,064.  Specification of Letters Patent.  Patented Mar. 13, 1917.

Application filed March 14, 1916. Serial No. 84,007.

*To all whom it may concern:*

Be it known that I, ROBERT W. ASHLEY, a citizen of the United States, residing at New York city, in the county of New York and State of New York, have invented new and useful Improvements in Vehicle-Wheel Rims, of which the following is a specification.

The invention relates to motor wheel rims and has particular reference to a rim structure designed specifically for demountable rims as utilized in connection with pneumatic tires.

One object of the invention is the providing of a felly or wheel band provided with locking means adapted to have seated thereon around the periphery of said band a rim, carrying drawing traction means adapted to engage said locking means, and means mounted on said locking means and engaging said drawing traction means adapted to exert on said rim a contractive and binding torque in two directions simultaneosly.

Another object of the invention is the providing of means carried by said rim and engaging the locking means on said band adapted to create a spring pressure transversely thereof during the locked position of said rim locking means, obviating all motion or play between the respective parts of the rim structure.

In the following is described in connection with the accompanying drawings one embodiment of the invention, the features thereof being more particularly pointed out hereinafter in the claims.

Figure 1:
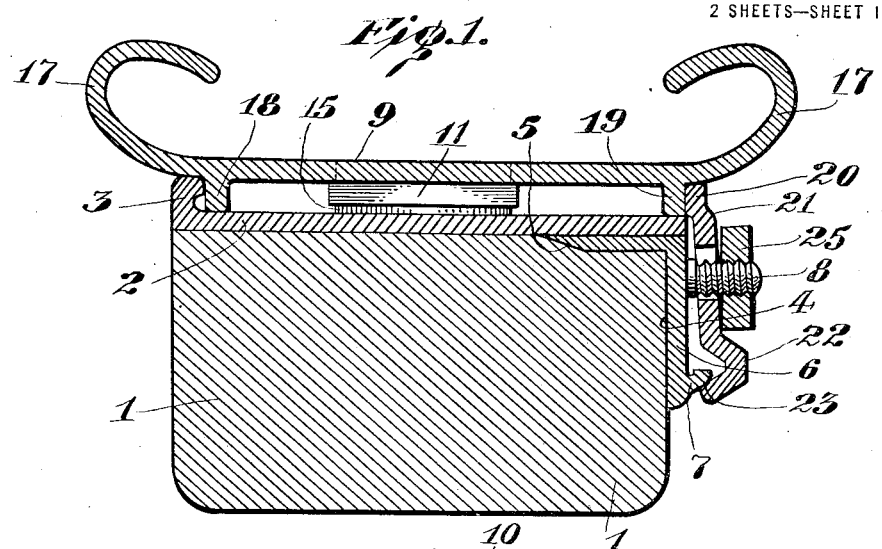
Figure 2:
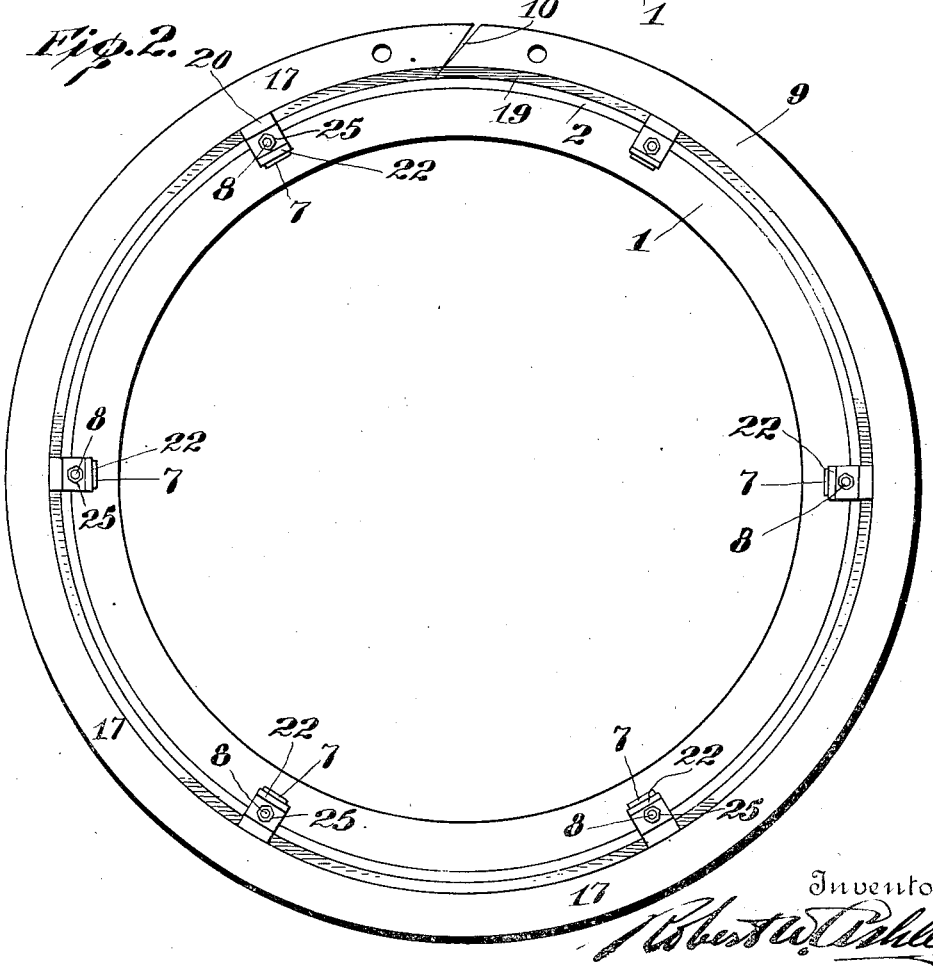

In the drawings Figure 1 is a cross sectional view of the rim; Fig. 2 is a face elevation of the rim; Fig. 3 is an enlarged cross sectional view of the rim locking and clamping means; Fig. 4 is a perspective view of one of the locking plates; Fig. 5 is a perspective view of one of the spring or drawing clamping cleats; and Fig. 6 is an elevation of the under side of the tire carrying rim adjacent the split in said rim.

Similar numerals of reference indicate similar parts throughout the several views.

In the drawings (1) designates a wood felly having mounted thereon a felly or wheel band (2) provided at its rear edge with a retaining shoulder (3); (4) indicates one of a series of locking plates welded to band or rim (2) at regular points around the inner surface thereof and comprises an upper plate (5) for welding to band (2) and a depending plate (6) having formed on its lower edge a cam shoulder or locking rib; (7) arranged to rest against the face of wood felly (1), and on its central face a threaded stud (8) adapted to receive a suitable locking means.

(9) indicates a tire-carrying or demountable rim split transversely thereof at one point in its annular body at (10), and locked beneath said split (10) by means of a hooked plate (11) provided with a hook (12) engaging an aperture (13) in the opposite split end thereof and a pivoted cleat (14) adapted to engage said hooked plate (11) for maintaining the ends of said rim (9) in circumferential alinement.

Plate (11) has formed therewith a traction stud (15) and a valve stem aperture (16) for engagement with an aperture in band (2) to prevent circumferential movement of said rim (9). The split (10) in rim (9) provides means for permitting a contractive action on band (2) by the locking means.

Rim (9) has formed thereon tire reception beads (17) and on its under surface at or near its edges depending heads (18) and (19) adapted for annular support around the periphery of band (2). Bead (18) engages the shoulder (3) on band (2) and bead (19) rests on and engages the outer edge of said band (2) and has welded thereon or formed therewith depending traction cleats (20) each provided with an offset (21) in its central face portion and at its lower edge with a spring or inverted drawing hook (22) provided with a sliding edge (23) adapted to engage and ride upon locking rib (7) on plate (6) and has also cut therein an elliptical hole or aperture (24) through which threaded stud (8) projects and receives a nut (25) for locking the respective parts together in a contractive and transversely contractive direction.

There may be four, five or six locking elements associated with the rim structure and the number utilized be in accordance with the diameter of the wheel to which it is applied. By placing the offset (2) in the formation of the cleat (19) and by reason of the engagement of hook (21) with rib (7) of locking plate (4) and when drawn together by means of nut (25) a perfect annular contractive and transversely contractive torque is placed on rim (9) causing said rim to contract and seat completely the beads (17) and (18) on the shoulder (3) and periphery of said band (2), and at the same time maintain a resilient contractive contact of both metal bodies or rim and band.

By welding the locking plates (4) on band (2) and cleats (19) on rim (9) a two element structure is provided which obviates all loose parts and accomplishes a result heretofore unattained in the locking together of two annular bodies.

It is obvious that the features of the invention may be widely varied without departing from the spirit of the invention.

What I claim and desire to secure by Letters Patent of the United States is:

1. A device of the character described comprising a fixed rim, a demountable rim loosely mounted thereon, and means associated with said fixed rim in relation to means forming part of said demountable rim for distorting said demountable rim into a plurality of points of contact on one edge of said fixed rim and for forcing it into circumferential contact on the opposite edge of said fixed rim.

2. A device of the character described comprising a fixed rim, a demountable rim loosely mounted thereon, and means associated with said fixed rim in relation to means forming part of said demountable rim for distorting said demountable rim into a plurality of points of contact on the front edge of said fixed rim and for forcing it into circumferential contact on the rear edge of said fixed rim.

3. A device of the character described comprising a felly band having mounted thereon independent fastening means, a demountable rim adapted for engagement with said felly band, a plurality of locking traction cleats mounted on said demountable rim adapted for engagement with said fastening means, and means associated with said fastening means and engaging said locking traction cleats adapted to exert a contractive and transverse binding action on said demountable rim to seat the same circumferentially on the rear edge of said felly band and at a plurality of points of contact on the front edge of said felly band.

4. A device of the character described comprising a fixed rim, a demountable rim loosely mounted thereon, means associated with said fixed rim in relation to means forming part of said demountable rim for distorting said demountable rim into a plurality of points of contact on one edge of said fixed rim and for forcing it into circumferential contact on the opposite edge of said fixed rim, and means limiting the lateral movement of said demountable rim with relation to said fixed supporting rim independent of the movement radially of said demountable rim.

5. A device of the character described comprising a fixed supporting rim, reception locking plates associated with said fixed rim, a demountable rim loosely mounted on said fixed supporting rim, means forming part of said demountable rim engaging said reception locking plates adapted to distort said demountable rim for forcing it into a plurality of points of contact on the front edge of said fixed rim and into circumferential contact on the opposite edge of said fixed rim, said distorting means acting as abutting means to seat said demountable rim laterally simultaneously with the locking of said demountable rim at the plurality of points of contact on said fixed rim.

In testimony whereof, I have hereunto signed my name in the presence of two subscribing witnesses.

ROBERT W. ASHLEY.

In presence of—
E. E. HAINES,
M. J. PFEIFFER.